United States Patent [19]
Baker

[11] 3,856,111
[45] Dec. 24, 1974

[54] HAND CLIMBER ACCESSORY FOR TREE-CLIMBING-HUNTING PLATFORMS

[76] Inventor: James E. Baker, 2202 Pinecliff Dr., Valdosta, Ga. 31601

[22] Filed: Apr. 16, 1974

[21] Appl. No.: 461,357

[52] U.S. Cl............................. 182/135, 182/187
[51] Int. Cl............................................ E04g 3/10
[58] Field of Search .......... 182/134, 136, 187, 133, 182/135

[56] References Cited
UNITED STATES PATENTS

| 983,335 | 2/1911 | Westad | 182/135 |
|---|---|---|---|
| 3,460,649 | 8/1969 | Baker | 182/187 |
| 3,485,320 | 12/1969 | Jones | 182/187 |

*Primary Examiner*—Reinaldo P. Machado
*Attorney, Agent, or Firm*—Dowell & Dowell

[57] ABSTRACT

The invention provides a hand-climber-accessory for tree-climbing platforms for hunters or the like, of the type having a base plate for positioning substantially horizontally against a tree or pole, and having a blade extending from its rear edge adapted to bite into the tree, and having angularly disposed frame members extending upwardly and rearwardly from the front end of the plate beyond the blade, and having a second blade or strap secured to the rear ends of the frame members adapted to engage the opposite side of the tree from the first blade, and having a foot strap on the top of the plate adapted to overlie the feet of the hunter. My novel hand climber accessory for said platform is adapted to be positioned on the tree or pole above the platform, and includes parallel bars adapted to embrace said tree or pole therebetween. Front and rear blades are mounted on the bars for biting into opposite sides of the tree or pole. A hand gripping tube is fixedly mounted on at the front end of the bars above the platform, whereby a hunter standing on the platform with his feet engaged in the foot strap and with his hands gripping the tube of the accessory may alternately, step-by-step, first adjust the elevation of the hand climber with respect to the platform, and then by simply hanging from the tube, raise or lower the platform by merely lifting and lowering his feet to first disenage and then re-engage the platform with respect to the tree or pole at a different elevation.

4 Claims, 6 Drawing Figures

HAND CLIMBER ACCESSORY FOR TREE-CLIMBING-HUNTING PLATFORMS

DESCRIPTION OF THE INVENTION

This invention is a novel so-called "hand climber" which can be used as an accessory to pole or tree climbing-hunting platforms of the type shown in my prior U.S. Pat. No. 3,460,649 issued Aug. 12, 1969.

In my prior U.S. Pat. No. 3,460,649 there is disclosed a pole or tree climbing-hunting platform having a base plate adapted to be positioned substantially horizontally against the side of a pole or tree; with a V-shaped blade extending from the rear edge of the plate adapted to bite into the pole or tree. Angularly disposed frame members extend upwardly and rearwardly from pivots at the front end of the base plate beyond the said blade and releasable braces normally maintain the working angularity between the base plate and frame members; and a second V-shaped blade is removably and adjustably secured to the rear ends of the frame members, same having a sharpened inner edge adapted to bite into the opposite side of the pole or tree from the first blade. The two blades embrace the pole or tree therebetween at different elevations. A foot strap is secured upon the top of the base plate adapted to overlie the feet of the person standing on the base plate while facing the pole or tree, so that the person, by placing his arms around the pole or tree and pulling his feet upwardly, may climb the pole or tree thereby raising the plate with respect to the pole or tree, a base plate remaining self-supporting in such raised position whenever the weight of the person is again distributed on the base plate.

In my prior patent, it is necessary in order to raise or lower the base plate which is at that time attached to the feet of the person for the person to grip or hug the pole or tree with his arms and when the desired elevation is reached, to then disengage his feet from the base plate after which he may then use the base plate as a platform for the purpose of standing or sitting thereon while hunting or for any other uses where a platform on a tree or pole may be required.

The principal objects of my present invention are to provide a novel so-called "hand climber" which is usable as an accessory to such platform and which hand climber can be carried along with the pole or tree stand or platform when folded, and will eliminate the necessity of the person hugging the pole or tree when ascending or descending, thus making it an easier and faster way for the person to get up or down the pole or tree.

A further object of the invention is to provide a hand climber of the above type which may provide a seat for the person to sit on, the hand climber being disposed above the platform, and both the hand climber and platform engaging the same pole or tree and having a similar double gripper blade action.

I will explain the invention with reference to the accompanying drawings, which illustrate one practical embodiment thereof, to enable others familiar with the art to adopt and use the same; and will summarize in the claims the novel feature of construction, and novel combinations of parts, for which protection is desired.

IN SAID DRAWINGS

Figure 2:
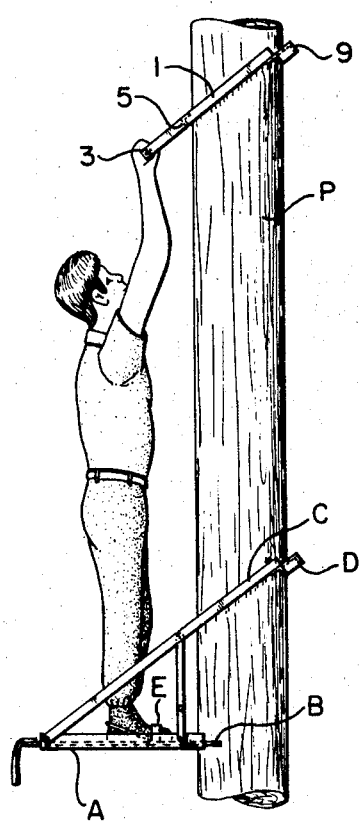
FIG. 2 is a view showing a person standing upon the platform and engaging the hand climber just previous to raising the platform by the upward drawing of the person's feet while the person is hanging from the hand climber.
Figure 3:
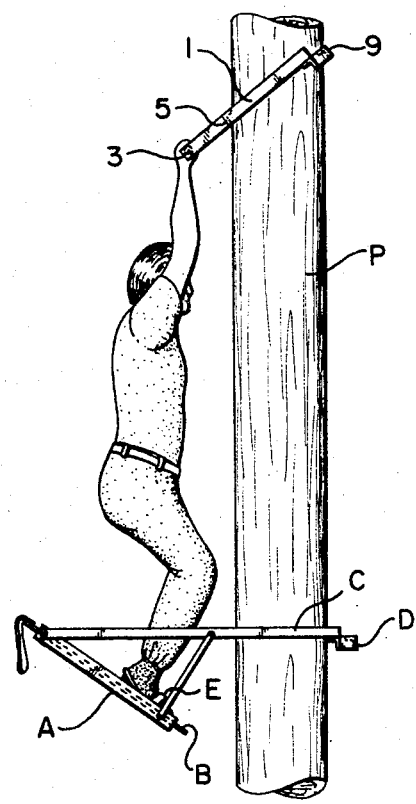
FIG. 3 is a view similar to FIG. 2, but showing the person in the act of raising the platform by the upward drawing of his feet while hanging from the hand climber.

The pole or tree climbing hunting platform shown in my prior U.S. Pat. No. 3,460,649 includes a base plate A adapted to be positioned substantially horizontally against the side of a pole or tree P, same having a blade B extending from its rear edge adapted to bite into pole P. Angularly disposed frame members C extend upwardly and rearwardly from the front end of base blade A beyond blade B, and a second blade D is removably and adjustably secured to the rear ends of frame members C, same having a sharpened inner edge adapted to bite into the opposite side of the pole P from the first blade B, the two blades B and D embracing the pole P therebetween at different elevations. A foot strap E is secured up on the top of the base plate A adapted to overlie the feet of the person standing on the base plate A (as shown in FIG. 2) while facing pole P, so that the person, by placing his arms tightly around the pole and then pulling his feet upwardly (as indicated in FIG. 3) may tilt the base plate A, thereby bringing the frame members C into substantially horizontally disposed position and disengaging the blades B and D from the pole P so that the base plate may be raised or lowered by the person's feet, the plate A remaining self-supporting in such raised or lowered position whenever the weight of the person is again distributed on the plate A. Thus, in my prior patent, in order to raise or lower the platform on the pole it is necessary for the person to hug the pole during each platform raising and lowering step.

In order to avoid the necessity of the person hugging the pole, as aforesaid, I have provided a so-called "hand climber" to be used as an accessory to the platform A, and which is to be disposed on the same pole P as the platform A, but positioned above same (as shown in FIGS. 1, 2, 3, and 4), the hand climber having a somewhat similar double gripper blade action as the platform A.

As shown in FIGS. 1–4, the "hand climber" comprises a pair of spaced parallel channel irons 1 adapted to embrace therebetween the pole P, with the front ends thereof terminating over the base plate A (as shown in FIGS. 1–4). A non-rotatable rod 2 fixedly connects the front ends of the channel irons 1 together in spaced relation, said rod 2 passing through a tube 3 of larger diameter than rod 2, and tube 3 being preferably welded, as at 4 (FIG. 5), to the rod 2 to prevent rotation of tube 3 on rod 2. Tube 3 is of a diameter to form an effective hand grip for the person standing on the platform A, as shown in FIGS. 2 and 3, so that the person can manipulate the "hand climber" by grasping the tube 3 only with his hands.

Between the channel irons 1, spaced from the tube 3 and parallel therewith is an angle iron 5 whose ends are welded to the channel irons 1. The rear edge 5a of the longitudinal leg of the angle iron 5 being sharpened to serve as a blade for engaging the pole P in a manner similar to and above blade B of the platform A.

Figure 1:
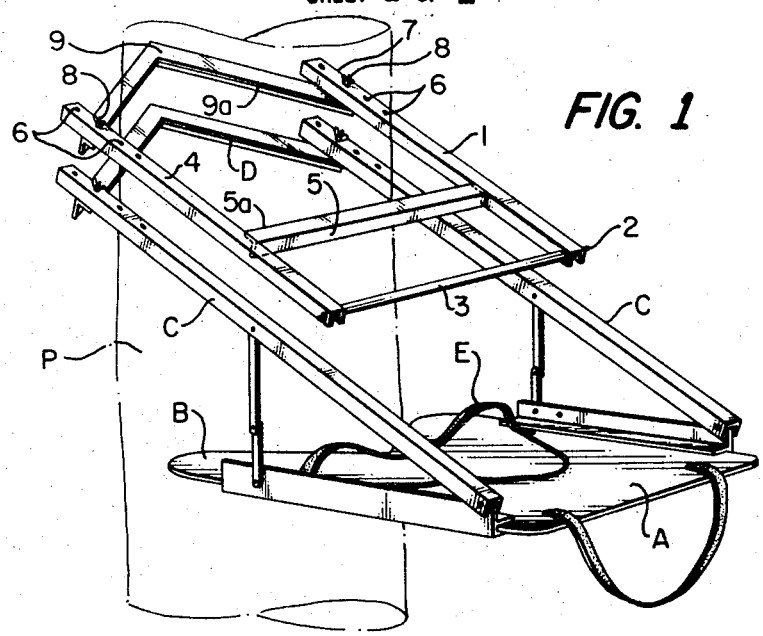
FIG. 1 is a perspective view of my novel hand climber and platform mounted upon a pole or tree, the hand climber being disposed above the platform.
Figure 6:
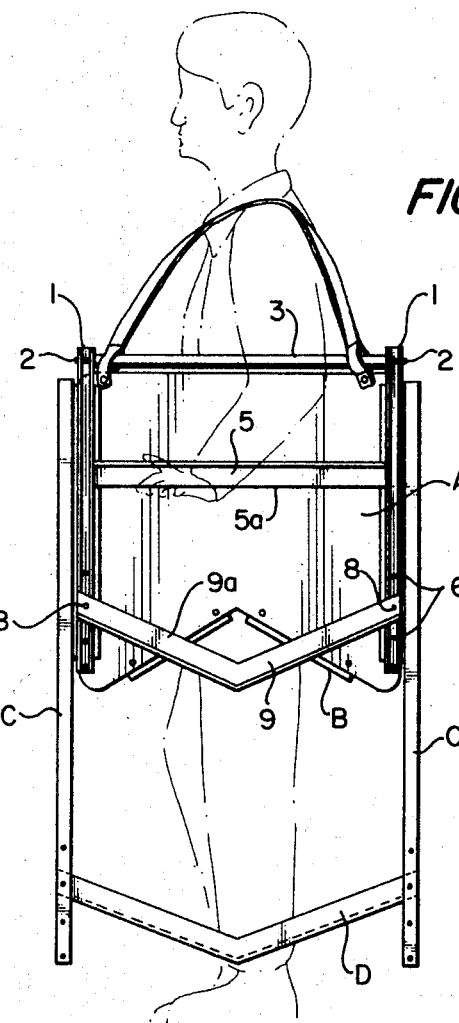
FIG. 6 is a view showing both the platform and the hand climber in folded position for easy carrying from place to place.

The rear ends of the channel irons 1 are provided with series of perforations 6 (FIG. 1) for bolts 8 which removably and adjustably secure a rear blade 9 to the rear ends of the channel irons 1 as shown in FIGS. 1 and 6. Blade 9 is adapted to engage the pole P in the same manner and above the blade D of the platform A, and as shown may be V-shaped and formed of angle iron, with the front edge of the horizontal leg of the angle iron sharpened as at 9a. Thus, the blades 5 and 9 of the hand climber operate in much the same manner as the blades B and D of the platform A when the weight of a person is applied to the tube 3 and the base plate A, in that both will be securely anchored on the pole P during application of such weight.

When, however, it is desired to raise or lower the platform on the pole P, the platform and hand climber must be operated alternately. When the person is standing on the platform A (as in FIG. 2) he can grip the tube 3 of the hand climber with his hands and readily adjust the hand climber to a higher or lower elevation on the pole. Then by hanging from the tube 3 the person can, by lifting or lowering his feet, while engaged under the foot strap E of the base plate A, raise or lower the platform on the pole P, this alternate action being repeated until the desired level of the platform on the pole is reached, as in FIG. 4. Thereafter, the person can disengage his feet from the foot strap E and stand or sit on the platform while hunting or the like.

Figure 4:
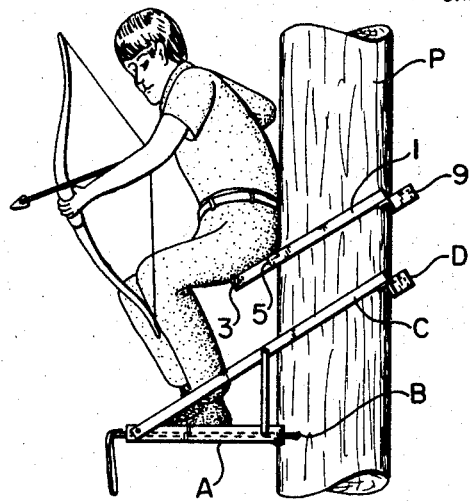
FIG. 4 is a view showing the person with his feet resting upon the platform, but seated upon the hand climber which is at that time disposed only slightly above the platform.
Figure 5:
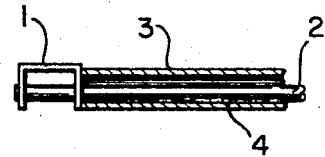
FIG. 5 is an enlarged detail section through the hand grip of the hand climber.

As shown in FIG. 4, the tube 3 may also be used as a convenient seat for the person whose feet are resting lightly on the platform A during the act of hunting or the like, the hand climber being then positioned conveniently only slightly above the platform.

Also, as shown in FIG. 6, both the platform and hand climber can be folded together into a relatively small flat package which as a unit may be carried by the person from place to place using a single shoulder strap.

I claim:

1. In combination with a tree climbing platform for hunters or the like of the type having a base plate adapted to be positioned substantially horizontally against a tree or pole, and having a blade extending from its rear edge adapted to bite into the tree, and having angularly disposed frame members extending upwardly and rearwardly beyond the blade from pivots adjacent the front end of the plate, and having a member removably secured to the rear ends of the frame members adapted to engage the opposite side of the tree from the blade, and having a foot strap on the plate adapted to overlie the feet of the hunter; a hand climber accessory for said platform adapted to be positioned on said tree or pole above the said platform, comprising spaced bars adapted to embrace said tree or pole therebetween; front and rear blades mounted on the bars for biting into the opposite sides of the tree or pole; and a hand grip tube fixedly mounted on at the front end of the bars above the platform, whereby a hunter standing on the platform with his feet engaged in the foot strap and with his hands gripping the tube of the accessory may alternately step-by-step first adjust the elevation of the hand climber with respect to the platform, and then by hanging from the tube, raise or lower the platform by merely lifting and lowering his feet to first disengage and then re-engage the platform with respect to the tree or pole at a different elevation.

2. In a combination as set forth in claim 1, said bars comprising channel irons; a rod non-rotatably connected to the front ends of the channel irons on which said tube is fixedly mounted; said front blade comprising an angle iron fixedly secured to the channel irons and having its horizontal leg sharpened to engage the tree or pole; the rear ends of the channel irons having series of perforations therein; and said rear blade being formed of angle iron with the rear edge of its horizontal leg sharpened to engage the tree or pole; and bolts passing through any of the series of perforations and through perforations in the ends of the rear blade and carrying thumb-nuts for adjustably mounting the rear blade on the accessory.

3. In a combination as set forth in claim 1, said tube serving as a seat for the hunter standing on the platform when the accessory is positioned on the tree or pole only slightly above the platform.

4. In a combination as set forth in claim 1, said platform and accessory being adapted to be folded together into a relatively small flat package and as a unit carried by the hunter from place to place using a single shoulder strap.

* * * * *